United States Patent
Chon et al.

(10) Patent No.: US 7,405,657 B2
(45) Date of Patent: Jul. 29, 2008

(54) RFID TAG FOR PROTECTING INFORMATION AND METHOD FOR PROTECTING PERSONAL INFORMATION

(75) Inventors: Hae-Don Chon, Yongin-si (KR); Sang-Won Ahn, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 179 days.

(21) Appl. No.: 11/348,711

(22) Filed: Feb. 7, 2006

(65) Prior Publication Data

US 2006/0186989 A1 Aug. 24, 2006

(30) Foreign Application Priority Data

Feb. 7, 2005 (KR) .................. 10-2005-0011204

(51) Int. Cl.
*G08B 13/14* (2006.01)

(52) U.S. Cl. .................. 340/572.1; 340/5.61; 340/10.1; 340/572.4; 726/26

(58) Field of Classification Search .............. 340/572.1, 340/5.61, 10.1, 572.2, 572.4, 572.5, 572.7, 340/572.8, 568.1, 505, 10.2, 10.3, 10.4, 551; 726/26; 380/255

See application file for complete search history.

(56) References Cited

U.S. PATENT DOCUMENTS

| | | | | |
|---|---|---|---|---|
| 6,356,197 | B1 * | 3/2002 | Patterson et al. | 340/572.1 |
| 6,466,771 | B2 * | 10/2002 | Wood, Jr. | 455/101 |
| 6,894,614 | B2 * | 5/2005 | Eckstein et al. | 340/572.1 |

* cited by examiner

*Primary Examiner*—Anh V La
(74) *Attorney, Agent, or Firm*—The Farrell Law Firm, PC

(57) ABSTRACT

Disclosed is an RFID tag for protecting information and a method for protecting personal information. The RFID tag for protecting information includes an encoder for simultaneously outputting first and second signals so as not to allow the RFID reader to distinguish respective RFID tags from each other in accordance with an information request signal from an RFID reader, a modulator for modulating the first and second signals output from the encoder, and first and second antennas respectively for outputting the modulated first and second signals. Therefore, personal information can be protected by preventing the information of the respective RFID tags from being read by unauthorized RFID.

14 Claims, 5 Drawing Sheets

RFID TAG FOR PROTECTING INFORMATION AND METHOD FOR PROTECTING PERSONAL INFORMATION

PRIORITY

This application claims priority under 35 U.S.C. §119 to an application entitled "RFID Tag for Protecting Information and Method for Protecting Personal Information" filed in the Korean Industrial Property Office on Feb. 7, 2005 and assigned Serial No. 2005-11204, the contents of which are incorporated herein by reference.

BACKGROUND OF THE INVENTION

1. Field of the Invention

The present invention relates generally to an RFID (Radio Frequency Identification) tag, and more particularly to an RFID tag that prevents personal information from being released.

2. Description of the Related Art

Generally, an RFID tag stores information, such as personal information, and transmits the information to an RFID reader if the information is requested from the RFID reader existing within a certain distance (e.g., 30 feet). Such a conventional RFID tag is shown in FIG. 1 which is a block diagram illustrating a conventional RFID tag. Referring to FIG. 1, an RFID tag 100 includes an antenna 102, a demodulator 104, a decoder 106, a memory 108, an encoder 110, and a modulator 112.

The antenna 102 inputs data to the RFID tag 100 and generates a signal to read the input data. The antenna 102 activates the RFID tag 100 through an electromagnetic field to allow an RFID reader (not shown) to communicate with the RFID tag 100. The demodulator 104 demodulates an RF signal received from the RFID reader through the antenna 102. The decoder 106 decodes the demodulated RF signal into digital data and transmits the decoded data to the encoder 110. The memory 108 stores information of the RFID tag 100 and can also store or personal information of a user who uses the RFID tag 100 and/or other data. The encoder 110 encodes the data stored in the memory 108 depending on the data transmitted from the decoder 106. The modulator 114 modulates the encoded data to the RF signal and outputs the modulated RF signal through the antenna 102.

Then, the RFID reader receives the RF-signal-type data output from the RFID tag 100 to obtain the information stored in the RFID tag 100 (e.g., the RFID tag's information, the user's personal information and/or other data).

Therefore, the aforementioned RFID tag can store more information than can be provided by a bar code. Moreover, this information can be obtained by the RFID reader within a certain radius even if it is not directly in contact with the RFID tag. Also, the RFID reader can decode a plurality of RFID tags at one time and decode a moving RFID tag. In this regard, the RFID tag is widely used in various fields.

For example, the RFID tags are used in parking management systems, recording measuring systems, input and output control systems, intelligent traffic systems, integrated management systems, livestock recognition systems, factory automation, and so on.

However, with development of the RFID technology, the aforementioned RFID tag can be read by authorized as well as unauthorized RFID readers. Therefore, the personal information stored in the RFID tag may be released to the unauthorized RFID reader without knowledge or consent. For this reason, a problem occurs in that a person's privacy and/or security may be compromised.

FIG. 2 is an exemplary view illustrating the leakage of personal information of a conventional RFID tag. Referring to FIG. 2, an unauthorized researcher can read RFID information from a consumer's RFID tag 100 containing information on price and purchase channel of clothes or articles of consumers, using an RFID reader 200 to obtain information relating to consuming status of the consumers at a department store or outlet. This is designed to obtain personal information about a consumer without consent of the consumer. Therefore, a problem occurs in that a person's privacy may be invaded.

Furthermore, a personal ID card such as a passport or a resident card may be read at a place such as an airport or major facilities by an authorized as well as an unauthorized RFID reader, to obtain personal information stored in the personal ID card. For this reason, the personal information stored in the personal ID card may be released by the unauthorized RFID reader without a user's knowledge or consent.

In this respect, it is essentially necessary to develop technology for preventing personal information in an RFID tag from being released when the RFID tag is used.

SUMMARY OF THE INVENTION

Accordingly, the present invention has been designed to solve the above and other problems occurring in the prior art, and an object of the present invention is to provide an RFID tag for protecting information and a method for protecting personal information, in which information of the RFID tag is prevented from being released.

Another object of the present invention is to provide an RFID tag for protecting information and a method for protecting personal information, in which information of the RFID tag is prevented from being read by unauthorized RFID.

In order to accomplish the above and other objects, there is provided an RFID tag for protecting information including an encoder for simultaneously outputting first and second signals so as to prevent the RFID reader from distinguishing respective RFID tags from each other in accordance with an information request signal from an RFID reader; a modulator for modulating the first and second signals output from the encoder; and first and second antennas for respectively outputting the modulated first and second signals.

In accordance with another aspect of the present invention, there is provided an RFID tag for protecting information including a demodulator for demodulating an information request signal received from an RFID reader; a decoder for decoding the demodulated information request signal to determine whether the information request signal is a signal for requesting an RFID tag ID or a signal for requesting a bit value of a predetermined level; an encoder for outputting a signal of predetermined bit values corresponding to the number of bits of general RFID tag IDs if the information request signal is a signal for requesting an RFID tag ID, and for simultaneously outputting first and second signals so as not to allow the RFID reader to distinguish respective RFID tags from each other if the information request signal is a signal for requesting a bit value of a predetermined level; a modulator for modulating the signal of predetermined bit values and the first and second signals output from the encoder; a first antenna for outputting the signal of predetermined bit values and the first signal modulated by the modulator; and a second antenna for outputting the second signal modulated by the modulator.

In accordance with still another aspect of the present invention, there is provided a method for protecting personal information in an RFID tag for protecting information, including: receiving an information request signal from an RFID reader; and simultaneously outputting first and second signals so as not to allow the RFID reader to distinguish between respective RFID tags in accordance with the information request signal from the RFID reader.

In accordance with still another aspect of the present invention, there is provided a method for protecting personal information in an RFID tag for protecting information, including: receiving an information request signal from an RFID reader; determining whether the information request signal is a signal for requesting an RFID tag ID or a signal for requesting a bit value of a predetermined level; outputting a signal of predetermined bit values corresponding to the number of bits of general RFID tag IDs if the information request signal is a signal for requesting an RFID tag ID; and simultaneously outputting first and second signals, so as to prevent the RFID reader from distinguishing between respective RFID tags if the information request signal is a signal for requesting a bit value of a predetermined level.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
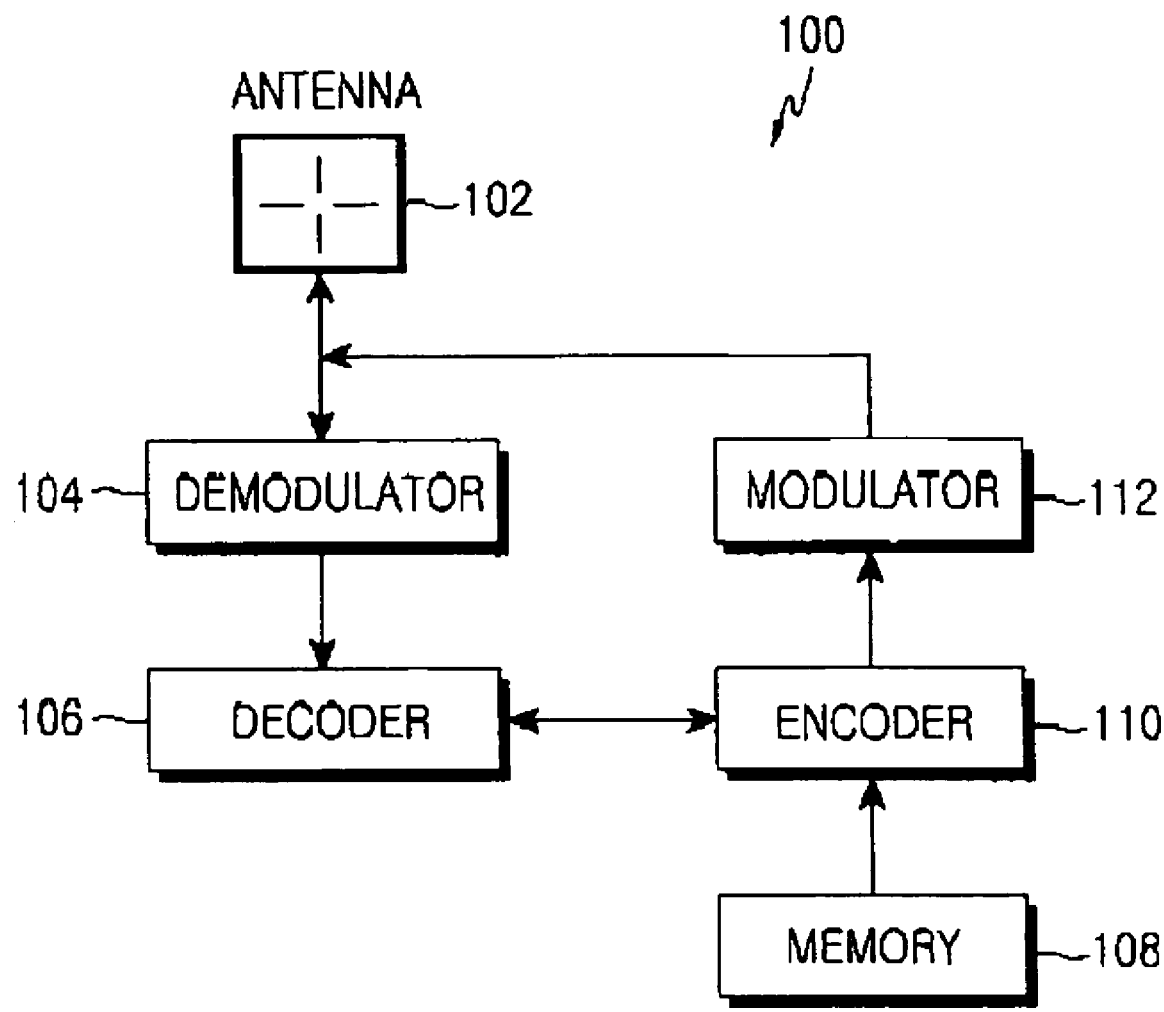
FIG. 1 is a block diagram illustrating a conventional RFID tag.
Figure 2:
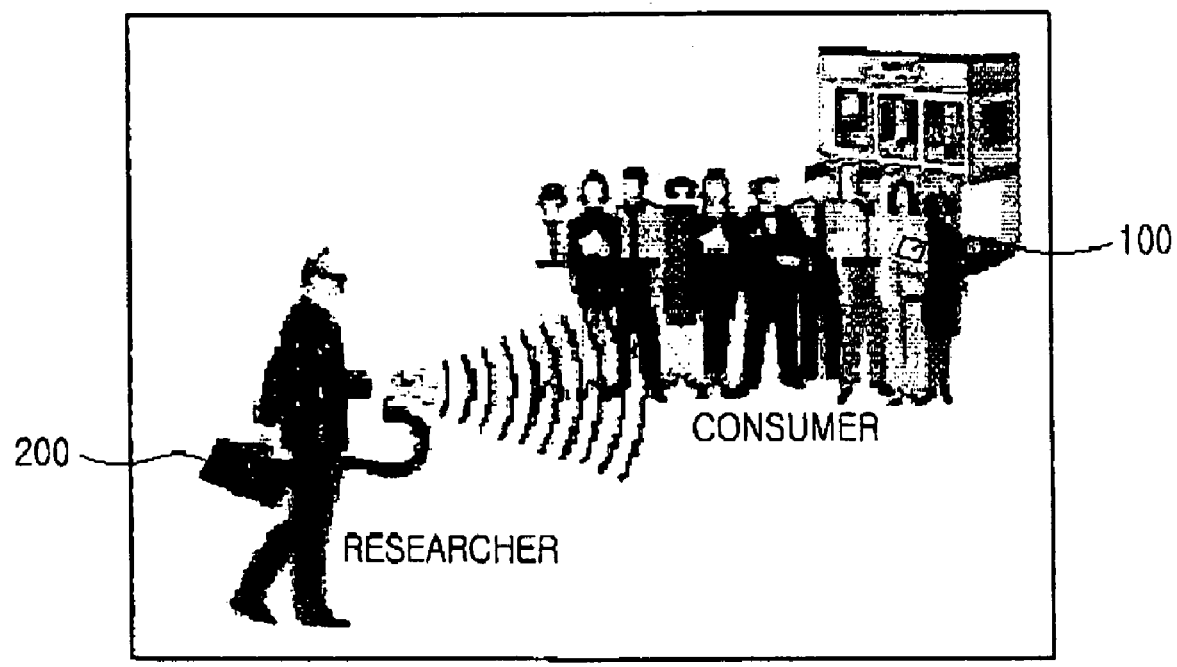
FIG. 2 is an exemplary view illustrating the leakage personal information of a conventional RFID tag.

Preferred embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

Conventionally, if an RFID reader transmits an information request signal to read data of RFID tags, the RFID reader receives information from the RFID tags and reads the information. In this case, personal information may be released.

Therefore, in the present invention, if the information is requested from the RFID reader, an RFID tag for protecting information is provided to transmit a signal that prevents the RFID reader from distinguishing between RFID tags and prevents the RFID reader from reading the information transmitted from the conventional RFID tags.

For better understanding of the RFID tag for protecting information according to the present invention, a method of reading information received from the conventional RFID tags using the RFID reader will be described.

Figure 3:
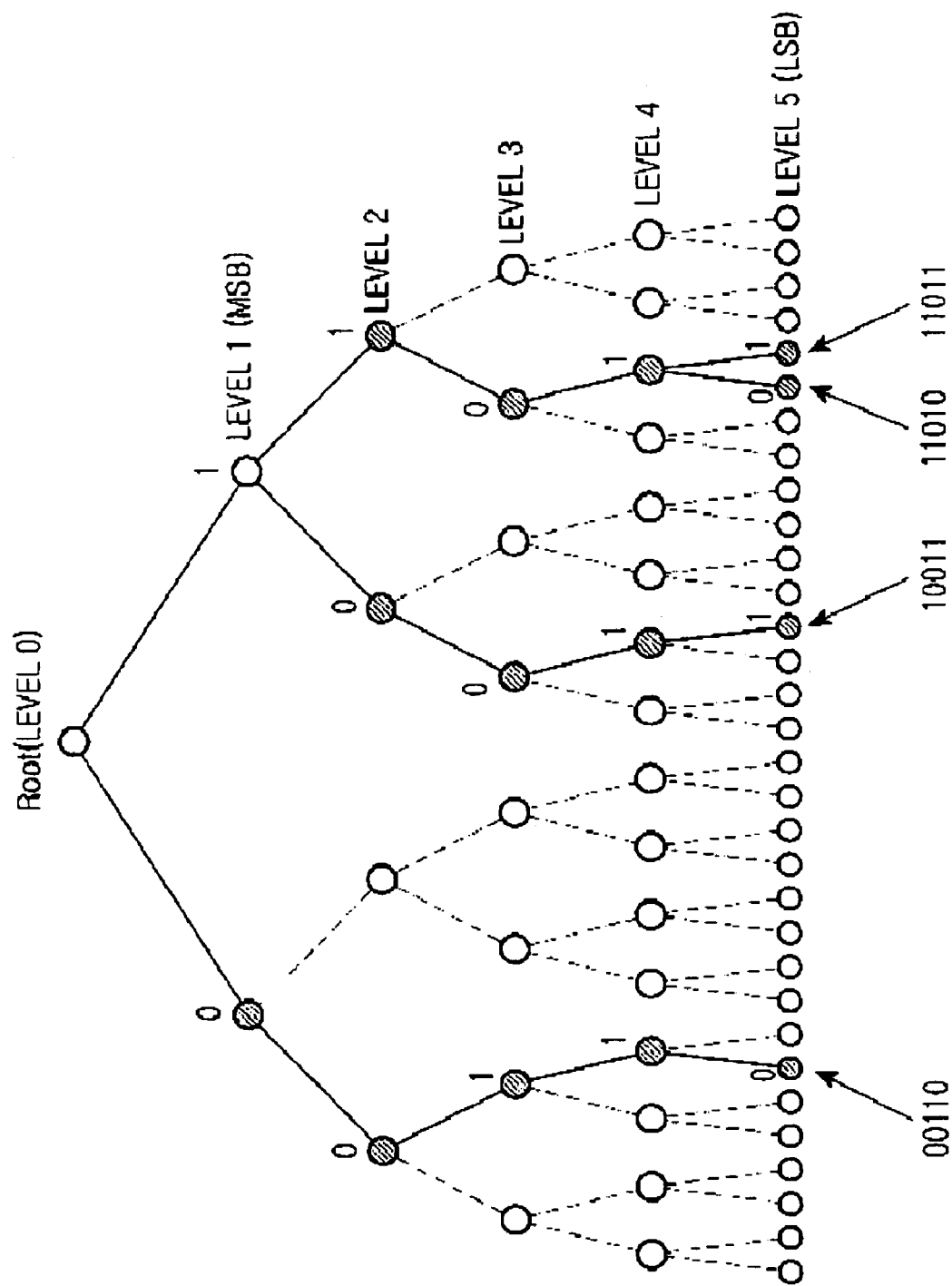
FIG. 3 is a graph illustrating a method of reading RFID tag information using an RFID reader according to the embodiment of the present invention.

FIG. 3 is a graph illustrating a method of reading RFID tag information using the RFID reader according to the embodiment of the present invention. The RFID reader exemplarily uses a bit binary tree algorithm mode that is the standard of an electronic product code (EPC).

After requesting information of the RFID tags, the RFID reader sequentially receives bits from the first level (e.g., Level 1 as shown) of the most significant bit (MSB) to the $n^{th}$ level of the lowest significant bit (LSB) and distinguishes the respective RFID tags from each other to receive and read information from each RFID tag.

In other words, the RFID reader distinguishes the respective RFID tags from each other depending on whether the received bits from the MSB to the LSB each have a value of "0" or "1". For example, if the bit values of "0" and "1" are simultaneously input to the RFID reader, the RFID reader selects an RFID tag corresponding to one of two bit values. The RFID reader temporarily ignores RFID tags not selected, and receives and reads information from the selected RFID tag. Then, the RFID reader sequentially selects the other RFID tags not selected to read their information.

In more detail, supposing that there exist four RFID tags respectively having bit values of "00110," "10011," "11011" and "11010," bit values of "0," "1," "1," and "1" corresponding to the first level of the MSB of each RFID tag can be input to the RFID reader when the RFID reader requests information of the RFID tags. Then, the RFID reader selects the RFID tag having the bit value of "0" corresponding to the first level among the input bit values and receives information of the selected RFID tag to read the information.

Then, the RFID reader requests bit values corresponding to the second level of the other three RFID tags to distinguish the three RFID tags not selected. Thus, bit values of "0," "1" and "1" corresponding to the second level of the three RFID tags are input to the RFID reader. Then, the RFID reader selects the RFID tag having the bit value of "0" corresponding to the second level and receives information of the selected RFID tag to read the information.

Subsequently, the RFID reader requests bit values corresponding to the third level of the other two RFID tags to distinguish the two RFID tags not selected. Thus, bit values of "0" and "0" corresponding to the third level of each RFID tag are input to the RFID reader. However, the RFID reader fails to distinguish the two RFID tags from each other if the bit values of "0" and "0," which are the same as each other, are input thereto. Therefore, the RFID reader requests bit values corresponding to the fourth level of the two RFID tags. Then, bit values of "1" and "1" corresponding to the fourth level of the two RFID tags are input to the RFID reader. However, the RFID reader still fails to distinguish the two RFID tags from each other if the bit values of "1" and "1," which are the same as each other, are input thereto, as in the case above.

Therefore, the RFID reader requests bit values corresponding to the fifth level (e.g., Level 5) of the two RFID tags to distinguish the two RFID tags not selected. Thus, bit values of "0" and "1" corresponding to the fifth level of the two RFID tags are input to the RFID reader. At this time, the RFID reader distinguishes the two RFID tags from each other because the bit values corresponding to the fifth level are different from each other. The RFID reader receives information of the two RFID tags to read the information.

As described above, the RFID reader reads the RFID tags in such a manner that if a number of RFID tags exist, the RFID reader compares bit values of the respective RFID tags with each other to distinguish them from each other and then receives information of the respective RFID tags to read the information. Therefore, if the respective RFID tags are not distinguishable from each other, it is impossible to receive and read the information of the respective RFID tags.

In the embodiment of the present invention, if the RFID reader requests information of RFID tags, an RFID tag for protecting information is provided to simultaneously respond "0" and "1" so that the RFID reader fails to distinguish the respective RFID tags from each other.

Hereinafter, the construction and the operation of the RFID tag for protecting information will be described in detail. First, the construction of the RFID tag for protecting information will now be described.

Figure 4:
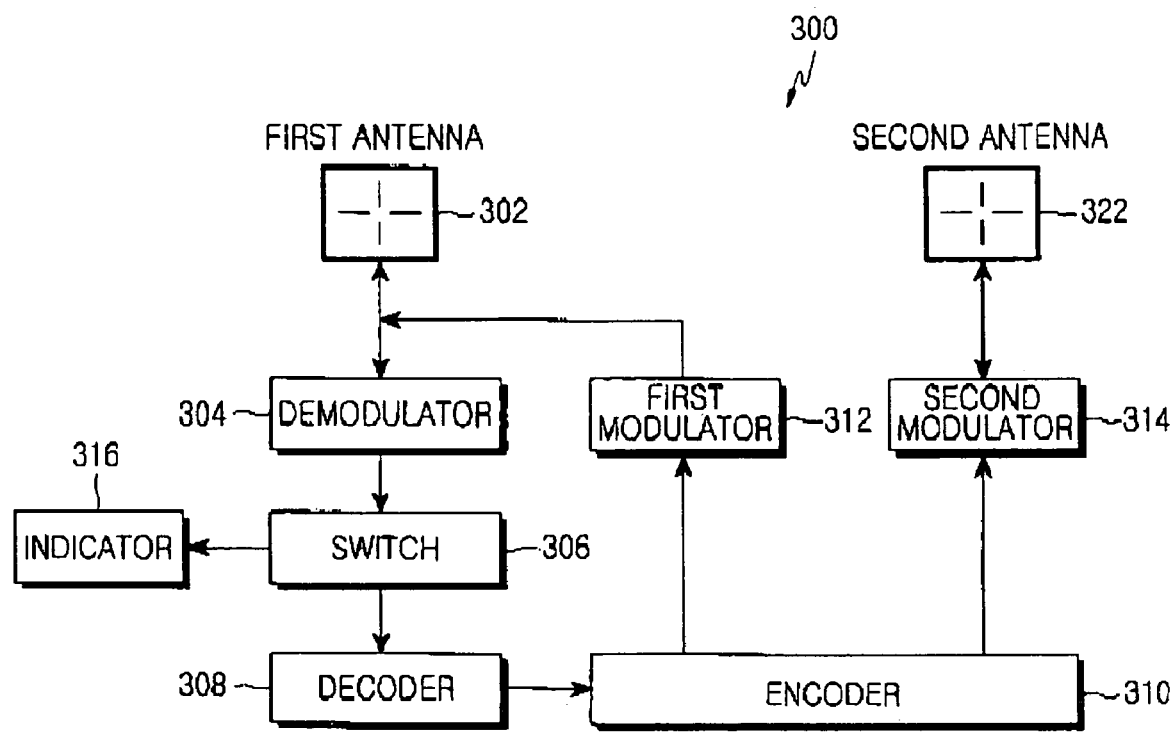
FIG. 4 is a block diagram illustrating the construction of an RFID tag for protecting information according to the embodiment of the present invention.

FIG. 4 is a block diagram illustrating the construction of an RFID tag for protecting information according to the embodiment of the present invention. The RFID tag 300 for protecting information according to the embodiment of the present invention includes a first antenna 302, a demodulator 304, a switch 306, a decoder 308, an encoder 310, a first modulator 312, a second modulator 314, an indicator 316, and a second antenna 322.

The first antenna 302 receives an information request signal from an RFID reader (not shown) and transmits a signal that does not allow the RFID reader to distinguish respective RFID tags from each other.

The demodulator 304 demodulates the information request signal received from the RFID reader through the antenna 302. The switch 306 carries out a switching operation so that the demodulator 304 is connected with, or is disconnected from, the decoder 308 depending on user's request. At this time, the RFID tag 300 is normally operated if the demodulator 304 is connected with the decoder 308. On the other hand, the RFID tag 300 is not operated if the demodulator 304 is disconnected from the decoder 308.

If the switch 306 is connected with the decoder 308 so that the information request signal demodulated by the demodulator 304 can be input into the decoder 308, the decoder 308 decodes the information request signal demodulated by the demodulator 304 into digital data. The decoder 308 determines through the decoded data whether the information request signal from the RFID reader is a signal for requesting an RFID tag ID or a signal for requesting a "1" bit value of a predetermined level. The decoder 308 transmits the determined result to the encoder 310.

If the information request signal from the RFID reader is a signal for requesting an RFID tag ID, the encoder 310 outputs predetermined bit values corresponding to the number of bits of general RFID tag IDs to the first and second modulators 312 and 314 on a one-by-one basis. If the information request signal from the RFID reader is a signal for requesting a "1" bit value of a predetermined level, the encoder 310 simultaneously outputs bit values of "0" and "1" to the first and second modulators 312 and 314.

The first modulator 312 modulates the bit values output from the encoder 310 into an RF signal and outputs the modulated RF signal through the first antenna 302. The second modulator 314 modulates the bit values output from the encoder 310 into an RF signal and outputs the modulated RF signal through the second antenna 322.

Therefore, the aforementioned RFID tag 300 for protecting information transmits an ID value having the same bit as that of the general RFID tag IDs to the RFID reader so as to allow the RFID reader to recognize itself along with the general RFID tags if the RFID reader requests an RFID tag ID. The RFID tag 300 simultaneously responds by transmitting bit values of "0" and "1" so as not to allow the RFID reader to distinguish the respective RFID tags from each other if the RFID reader requests a "1" bit value of a predetermined level.

Hereinafter, the operation of the RFID tag for protecting information according to the embodiment of the present invention will be described.

Figure 5:
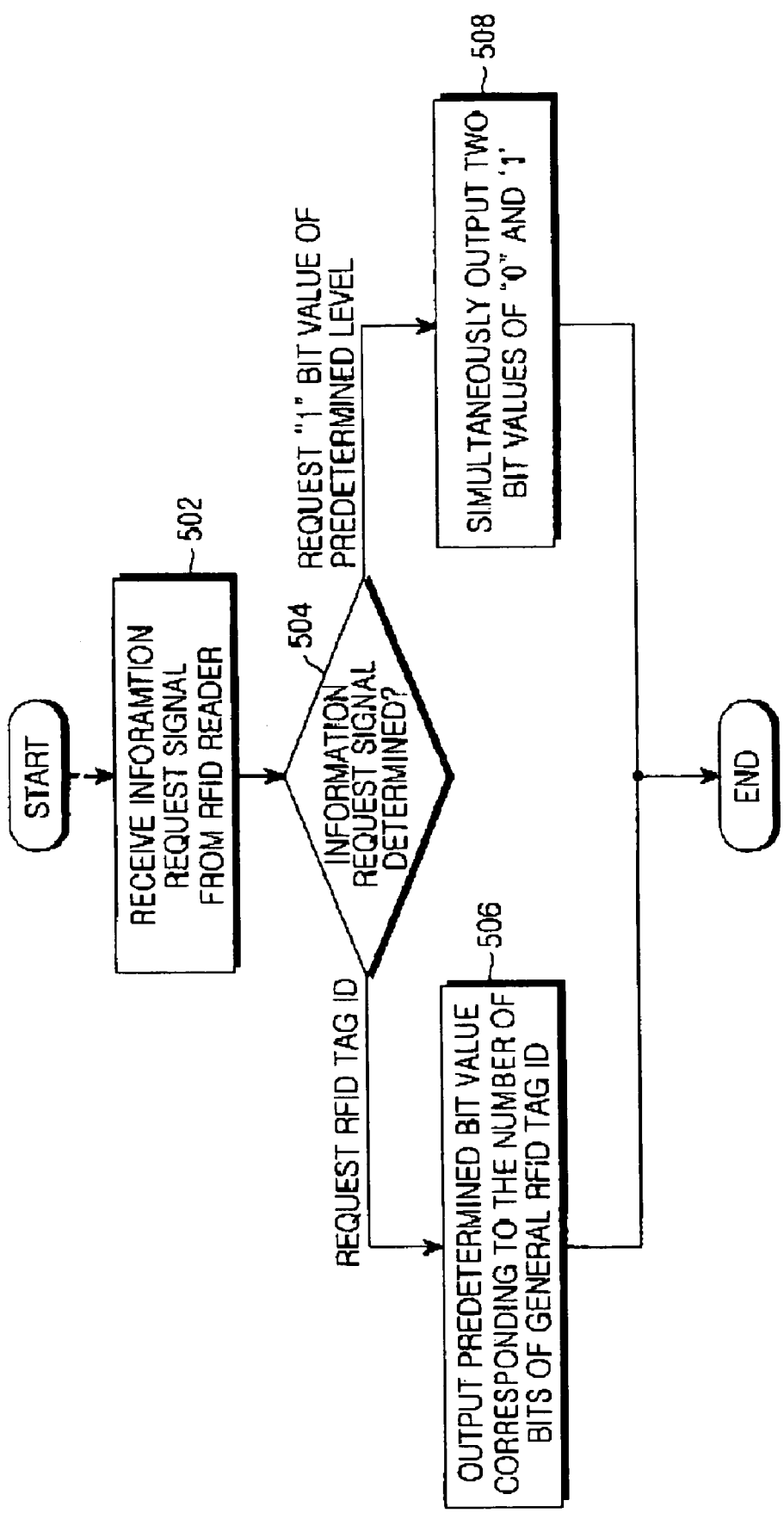
FIG. 5 is a flow chart illustrating the operation of an RFID tag for protecting information according to the embodiment of the present invention.

FIG. 5 is a flow chart illustrating the operation of an RFID tag for protecting information according to the embodiment of the present invention. The RFID tag 300 for protecting information receives the information request signal from the RFID reader in step 502.

Then, the RFID tag 300 determines whether the information request signal from the RFID reader is a signal for requesting an RFID tag ID or a signal for requesting a "1" bit value of a predetermined level in step 504.

If the request signal from the RFID reader is a signal for requesting an RFID tag ID, the RFID tag 300 responds by transmitting predetermined bit values by the number of bits of the general RFID tag IDs in step 506. For example, the RFID tag 300 can respond by transmitting a "1" bit value using a loop algorithm until the output bit value reaches the number of the general RFID tag IDs.

If the RFID tag 300 responds by transmitting a predetermined bit value by the number of the general RFID tag IDs, the RFID reader can recognize the presence of the RFID tag 300 along with the general RFID tags. At this time, the RFID reader implements a "crash" algorithm to distinguish the respective RFID tags from each other through a "1" bit value of a predetermined level of each RFID tag if a number of the RFID tags are recognized.

If the information request signal from the RFID reader is a signal for requesting a "1" bit value of a predetermined level, the RFID tag 300 simultaneously responds by simultaneously transmitting bit values of "0" and "1" respectively through the first and second antennas (302 and 322) in step 508.

If the RFID tag 300 simultaneously responds by transmitting bit values of "0" and "1," the RFID reader receives both the bit values of the general RFID tags and the bit values of "0" and "1" from the RFID tag 300. As a result, the RFID reader is prevented from distinguishing between the respective RFID tags. In this case, the RFID reader fails to receive and read information of the respective RFID tags, thereby preventing the information of the respective RFID tags from being released.

Therefore, the aforementioned RFID tag according to the embodiment of the present invention turns the switch 306 on (which then couples the demodulator 304 to the decoder 308) in either a zone where users do not need to disclose their information or in a circumstance in which personal information may be released, thereby failing to unintentionally release the information of the RFID tag (which can include personal information). Furthermore, the RFID tag according to the embodiment of the present invention turns the switch off in either a zone, such as an airport, where users may be required to disclose their information. Thus, the operation of protecting information is not performed so that the RFID tag 30 can be read normally At this time, to prevent the users from intentionally turning the tag switch off in a zone where the users are required to disclose their information, such as at an airport, the RFID tag may additionally be provided with a function that is indicative of the turned-on state of the switch 306. For example, the indicator 316 which can include an LED (light emitting diode), a speaker, a buzzer, etc. or a combination thereof, can be used to indicate a turned-on state of the switch 306.

As described above, the RFID tag for protecting information and the method for protecting personal information have an advantage in that personal information can be protected by preventing the information of the RFID tags of the users from being released. In other words, it is possible to protect personal information of users by preventing information of the general RFID tags from being read by unauthorized RFID readers as the users have the RFID tag for protecting information along with the general RFID tags. In addition, it is possible to extend an RFID area by protecting personal information. Moreover, in the present invention, since physical changes or modification to the RFID tag or separate active access that prevents information in the RFID tag from being released is not required, it is possible to improve use efficiency of a passive type RFID tag device.

For example, the RFID tags according to the present invention, can be used by a user to prevent information from being read from the user's other RFID tags in the vicinity (e.g., worn by the user). Thus, by carrying and activating the RFID tag of the present invention, the user can prevent information contained in the user's other RFID tags (e.g., an RFID tag containing personal information, account information, etc.) from being read by an unauthorized reader.

While the present invention has been shown and described with reference to certain preferred embodiments thereof, it will be understood by those skilled in the art that various changes in form and detail may be made therein without departing from the spirit and scope of the present invention as defined by the appended claims.

What is claimed is:

1. An RFID tag for protecting information comprising:
   an encoder for simultaneously outputting, in accordance with an information request signal from an RFID reader, first and second signals for preventing the RFID reader from distinguishing between RFID tags;
   a modulator modulating the first and second signals; and
   first and second antennas for outputting the first and second signals, respectively.

2. The RFID tag as claimed in claim 1, further comprising:
   a demodulator for demodulating the information request signal received from the RFID reader; and
   a decoder decoding the demodulated information request signal.

3. The RFID tag as claimed in claim 1, wherein the first and second signals respectively correspond to a "0" bit signal and a "1" bit signal.

4. The RFID tag as claimed in claim 1, further comprising a switch for switching, in accordance with user's request, the demodulator to the decoder to either normally operate or fail to normally operate the RFID tags.

5. The RFID tag as claimed in claim 1, further comprising a switch for operating the RFID tag in a "normal" or a "turned-off" state.

6. An RFID tag for protecting information comprising:
   a demodulator for demodulating an information request signal received from an RFID reader;
   a decoder for decoding the demodulated information request signal to determine whether the information request signal is a signal for requesting an RFID tag ID or a signal for requesting a bit value of a predetermined level;
   an encoder for:
      outputting a signal of predetermined bit values corresponding to the number of bits of general RFID tag IDs if the information request signal is a signal for requesting an RFID tag ID; and
      simultaneously outputting first and second signals, so as not to allow the RFID reader to distinguish between RFID tags if the information request signal is a signal for requesting a bit value of a predetermined level;
   a modulator modulating the signal of predetermined bit values and the first and second signals output from the encoder;
   a first antenna outputting the signal of predetermined bit values and the first signal modulated by the modulator; and
   a second antenna outputting the second signal modulated by the modulator.

7. The RFID tag as claimed in claim 6, wherein the first and second signals respectively correspond to a "0" bit signal and a "1" bit signal.

8. The RFID tag as claimed in claim 6, further comprising a switch for switching, in accordance with user's request, the demodulator to the decoder.

9. The RFID tag as claimed in claim 8, wherein the switch causes the RFID tag to operate in a "normal" or in a "turned-off" state.

10. A method for protecting personal information in an RFID tag for protecting information, comprising:
    receiving an information request signal from an RFID reader; and
    simultaneously outputting, in accordance with the information request signal from the RFID reader, first and second signals to prevent the RFID reader from distinguishing between RFID tags.

11. The method as claimed in claim 10, wherein the first and second signals, respectively correspond to a "0" bit signal and a "1" bit signal.

12. A method for protecting personal information in an RFID tag for protecting information, comprising:
    receiving an information request signal from an RFID reader;
    determining whether the information request signal is a signal for requesting an RFID tag ID or a signal for requesting a bit value of a predetermined level;
    outputting a signal of predetermined bit values corresponding to the number of bits of general RFID tag IDs if the information request signal is a signal for requesting an RFID tag ID; and
    simultaneously outputting first and second signals so as to prevent the RFID reader from distinguishing between respective RFID tags if the information request signal is a signal for requesting a bit value of a predetermined level.

13. The method as claimed in claim 12, wherein the first and second signals respectively correspond to a "0" bit signal and a "1" bit signal.

14. The method as claimed of claim 12, wherein the first and second signals, synchronously output through separate antennas.

* * * * *